Oct. 1, 1957    K. M. LEDERER    2,808,567
INSTRUMENTS WITH PERMANENT MAGNET CORES
Filed May 28, 1952    2 Sheets-Sheet 1
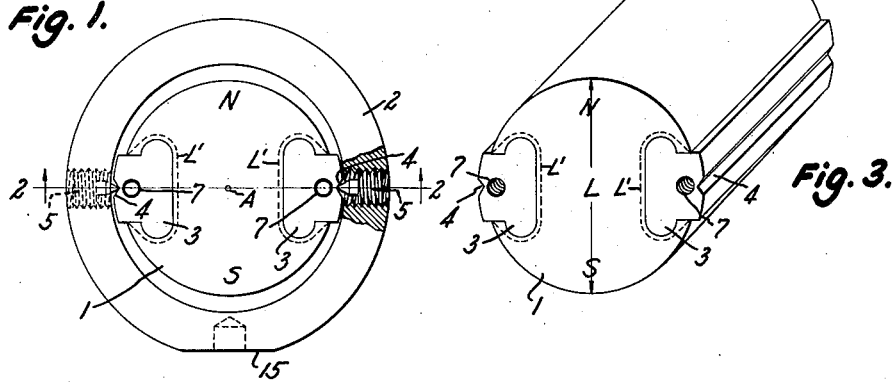
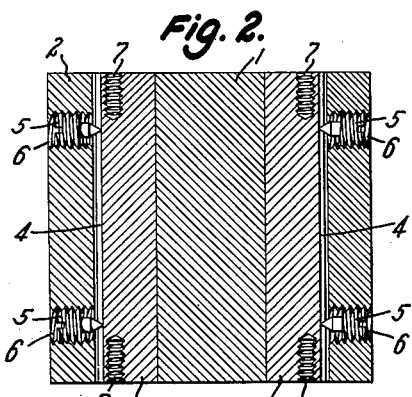
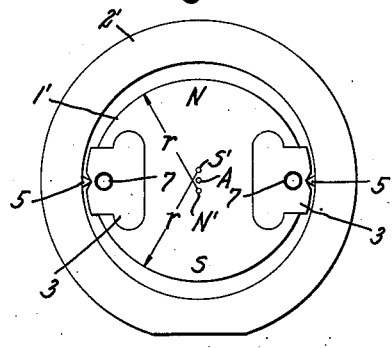
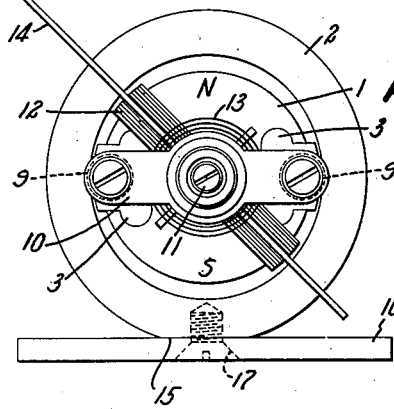
INVENTOR:
Karl M. Lederer,
BY Pierce, Scheffler & Parker,
ATTORNEYS.

Oct. 1, 1957 K. M. LEDERER 2,808,567
INSTRUMENTS WITH PERMANENT MAGNET CORES
Filed May 28, 1952 2 Sheets-Sheet 2
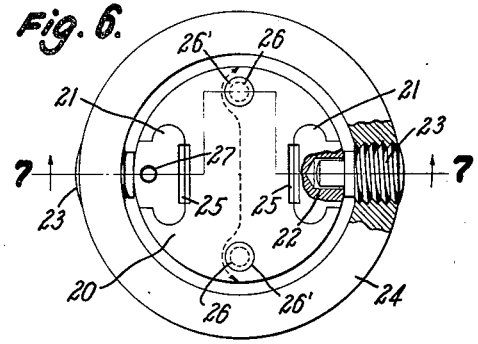
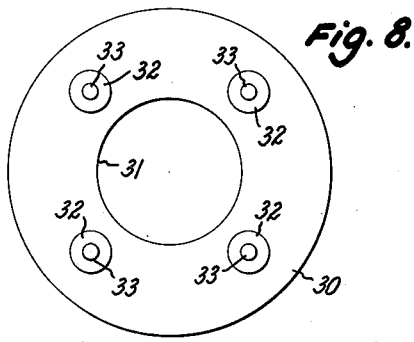
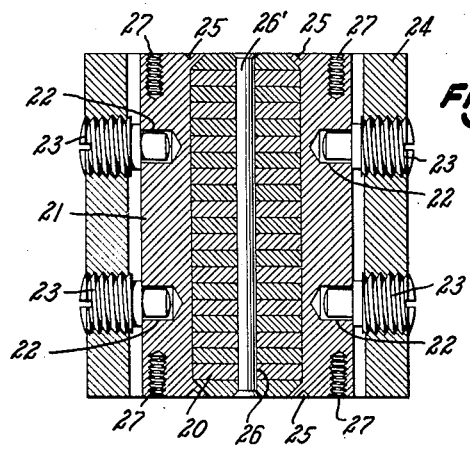
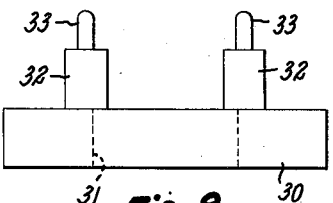
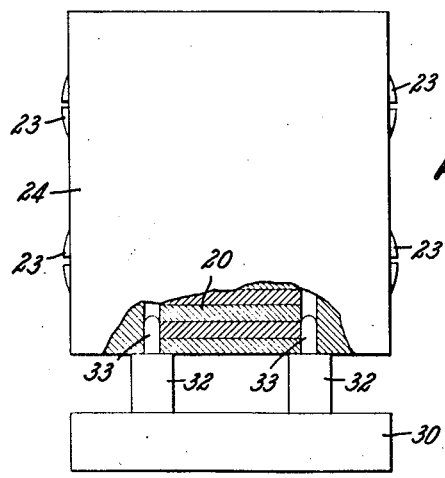
INVENTOR:
Karl M. Lederer,
BY Pierce, Scheffler & Parker,
ATTORNEYS.

United States Patent Office

2,808,567
Patented Oct. 1, 1957

2,808,567

INSTRUMENTS WITH PERMANENT MAGNET CORES

Karl M. Lederer, Newark, N. J., assignor to Weston Electrical Instrument Corporation, Newark, N. J., a corporation of New Jersey Application May 28, 1952, Serial No. 290,383

6 Claims. (Cl. 324—151)

This invention relates to electrical measuring instruments and instrument relays with permanent magnet cores, and more particularly to a novel construction of the magnetic field structure whereby the movable coil of such instruments can rotate throughout a relatively large annular deflection in a susbtantially uniform magnetic flux gap obtained without the use of pole pieces.

The several advantages of the permanent magnet core type of electrical instruments are now well recognized, and various constructions for the magnetized core element and its mounting within a yoke have been proposed. Soft iron pole pieces have been employed with the permanent magnets to obtain a more uniform distribution of the magnetic flux in the air gaps, and thereby a more uniform instrument scale, than has been possible with the prior constructions in which the permanent magnet comprised the entire core element. The soft iron pole pieces increased the mechanical problems of assembling instruments of the magnet core-coil-soft iron ring yoke type, and thereby increased the manufacturing costs to such an extent that there has been comparatively little commerical manufacture of magnet core instruments having uniformly graduated and relatively long scales, and of reasonably high precision.

The magnet core elements of the prior instruments have been rigidly secured in fixed position with respect to the soft iron yokes and, when once assembled, it has not been possible to adjust the core element to alter the scale characteristics of an instrument. If the core element and yoke were not precisely coaxial, or if there were hard spots or other irregularities in the permanent magnet, the resultant variation in flux density along the air gaps was frequently such that a desired instrument accuracy could be had only by an individual calibration of the instrument scale.

Objects of the invention are to provide electrical instruments, including instrument relays, of the core magnet type in which the permanent magnet core is of such cross-section as to afford, when positioned within a soft iron ring yoke, an approximately uniform magnetic flux distribution along air gaps having a circumferential length of above 150 degrees. Objects are to provide electrical instruments of the type stated, and core magnets for incorporation in such instruments, in which a desired flux distribution is obtained by so shaping the cross-section of the permanent magnet core that the lengths of all flux paths within the permanent magnet material are approximately equal, whereby the flux distribution along air gaps of uniform length will be approximately uniform. Objects are to provide electrical instruments with permanent magnet cores as above specified, and in which the cross-section of the cores and/or of the ring yokes departs somewhat from accurately circular form to provide air gaps which vary in length from point to point thereof to compensate for non-uniformity in the flux distribution along the polar surface of the permanent magnet core which forms one boundary of the air gap. Other objects are to provide electrical instruments of the magnet core type in which the core can be adjusted, after initial assembly on a ring yoke, to compensate to a greater or less extent for variations in flux density along the air gaps. Further objects are to provide core magnet instruments in which the magnet core element is supported with its median plane substantially coinciding with an axial plane through the yoke, and the magnet core element may be displaced in the direction of its median plane to obtain an optimum distribution of the magnetic flux along the air gaps. More specifically, an object is to provide a core magnet instrument in which the magnet core is a permanent magnet having the general form of a right circular, or approximately right circular cylinder, with recesses of flattened-T or mushroom shape along opposite sides thereof, and mounting ribs cast, molded or fitted into the core recesses, the mounting ribs having longitudinally extending V-slots for receiving mounting screws which are threaded through the instrument ring yoke, the overall width through the mounting ribs being somewhat less than the diameter of the yoke bore, whereby the core assembly may be adjusted radially within the bore of the yoke.

These and other objects and advantages will be apparent from the following description when taken with the acompanying drawings illustrating several embodiments of the invention. The drawings are for purposes of illustration and are not to be construed as defining the scope or limits of the invention, reference being had for the latter purpose to the appended claims.

In the drawings wherein like reference characters denote like parts in the several views:

Figure 1 is a plan view, with parts in section, of a magnetic system of an instrument made in accordance with one embodiment of this invention, the magnetic core being of circular cross-section and located within a soft-iron ring having an elliptical bore to provide an air gap having a somewhat greater length in the polar center line of the magnet to compensate for the stronger magnetic field at these points;

Figure 2 is a substantially vertical section through the same on line 2—2 of Fig. 1;

Figure 3 is an isometric view of the permanent magnet core with the mounting ribs;

Figure 4 is a plan view of an electrical instrument with a magnetic field system as shown in Figures 1–3;

Figure 5 is a plan view similar to Figure 1 but showing a magnet core of elliptical cross-section providing air gaps of non-uniform length;

Figure 6 is a plan view, with parts in section, of a magnetic system wherein the permanent magnet core comprises a plurality of laminae;

Figure 7 is a vertical section taken along the line 7—7 of Figure 6;

Figure 8 is a plan view of a fixture used for properly centering the magnet core within the soft-iron yoke;

Figure 9 is a side view of such fixture; and

Figure 10 is a side elevation, with parts in section, illustrating a magnetic structure of the type shown in Figures 6 and 7 assembled on the fixture.

Referring now to Figures 1–3, the reference numeral 1 identifies a transversely magnetized permanent magnet core of right circular cylindrical form within a ring-shaped yoke 2 of soft-iron having an inner wall of slightly elliptical cross-section, the long axis of which coincides with the vertical center line of the yoke wall, as viewed in Fig. 1, thereby providing slightly longer air gaps at the center of the magnet than at the ends of the magnet poles. The opposite sides of the permanent magnet core 1 are provided with relatively deep grooves of shallow-T or mushroom form, and mounting ribs 3 of non-magnetic material, such as brass, die metal, plastic, etc., are inserted into the grooves and soldered or cemented to the core 1. Alternatively, such ribs can be cast or molded into the grooves of the magnet. The mounting ribs project beyond the core 1 and terminate in arcuate surfaces provided with longitudinally extending V-shaped slots 4, the vertices of the slots being accurately located in the median plane through the core magnet 1 and normal to the mean path of the magnetic flux therethrough.

The pole arc of the air gap is relatively large, thereby permitting a longer instrument scale, since the edge portions of each polar surface extend beneath the head portions of the ribs 3 of shallow-T cross-section and into contact with the stem portions of the T-shaped ribs. The cross-section of the magnet core 1 is such that the length L' of any off-center flux path approaches the length L of the flux path through the axis A and in the direction of magnetization of the core 1. In the practical manufacture of instruments with the new magnet cores it is customary to make the mounting ribs 3 of such size that the width or cross-section of the magnet between ribs 3 is reduced to from about ½ to ⅔ of its original diameter. With this relationship, the total flux of the magnet is actually increased somewhat as the increase in the mean length of the flux path within the magnet more than compensates for the reduction in flux due to some removal of magnet material at its greatest width. If the air gaps were of the constant radial length, the flux distribution along the polar surface would vary almost directly with the lengths L, L' of the flux paths at different regions of the permanent magnet core. While this approximation to a uniform flux density is satisfactory for some applications, the length of the air gap of the Fig. 1 magnetic systme varies from a maximum at the center to somewhat lesser values at the side edges. The flux density along the air gap is substantially uniform when the length of the air gap varies almost directly with the lengths of the adjacent flux path in the magnet. It may here be stated the desired increase in the air gap length at the center line of the magnet core may be obtained by pressing in the sides of the yoke (at the mounting ribs) to form a slightly elliptical shape, as shown in Figure 1. Alternatively, the magnet core can be ground to an elliptical form in which case the bore in the yoke would be circular, as will be described with reference to Figure 5.

Mounting screws 5 are threaded into bores 6 which extend through opposite walls of the yoke and are accurately located in a plane through the axis of the bore of the yoke 2, and the screws have sharply pointed ends for seating in the vertices of the V-shaped slots 4 of the mounting ribs 3. The diameter of the core assembly, as measured at the mounting ribs 3, is somewhat less than the internal diameter of the yoke to provide a slight clearance which permits adjustment of the core assembly in the direction of a plane through the V-shaped slots 4, see Figure 1. The range of adjustment of the magnet core assembly need be only a few thousandths of an inch, but even this small adjustment range is of major importance in the manufacture and assembly of core magnet instruments since it provides compensation for manufacturing tolerances or for slight imperfections in the permanent magnet material which introduce minor variations in the substantially uniform flux distribution along the air gaps of the magnetic system.

The ribs 3 may be provided with threaded bores 7 for receiving studs 9 to support the bridges 10 in which bearing assemblies 11 are mounted to support a coil 12 for angular movement in the air gaps between the magnetized core assembly 1 and the yoke 2, as shown in Figure 4. Alternatively, the bridges could be supported from the yoke as described in my copending application Serial No. 63,748, filed December 6, 1948. Conventional spiral springs 13 are connected between the bridges 10 and the movable system which includes a pointer or contact arm 14 for cooperation with a scale and/or relay contacts, not shown. The basic instrument assembly of a magnetic system and a movable coil system may be mounted upon a base in any convenient or desired manner. As described in my copending application, the yoke may rest upon and be secured to a mounting plate or, as shown, the yoke 2 may have a flat surface 15, see Fig. 1, for seating against a vertically arranged base 16 to which it is secured by screws 17, see Fig. 4.

As illustrated in Fig. 5, the desired variation of air gap length may be obtained with a yoke 2' having an inner surface of right circular cylindrical form by grinding the polar surfaces N, S of the magnet core 1' to the same radius r but on axes N', S' which are displaced from the core axis A to provide air gaps of greater length at the center of the polar surfaces than at the ends thereof. The resulting approximately elliptical cross-section of the magnet also promotes a uniform flux density by reducing the lengths of the flux paths properly at different regions of the core.

My novel arrangement for mounting the permanent magnet core is not restricted to solid permanent magnets. Figures 6 and 7 which correspond, generally, to Figures 1 and 2, illustrate a permanent magnet 20 made up of a plurality of laminations of an alloy having a high magnetic energy product such as cobalt, "Alnico," etc. The laminae may be punched, sintered or molded, according to the material used, to proper shape including the appropriately-shaped, diametrically-opposed openings for accommodation of the mounting ribs 21. In the present construction the mounting ribs lie within the circumference of the magnet core whereby the core system is a regular, right cylinder. Each mounting rib is provided with two transverse holes 22 which accommodate the ends of the mounting screws 23 that are threaded into transverse holes in the soft-iron yoke 24. These screws are made of a non-magnetic material and the diameter of the inner end of the screws is slightly less than that of the holes 22, in the mounting ribs, to allow a small adjustment of the core system in all directions relative to the yoke. This diametric clearance, between the screw and the hole, varies, in a practical sense, with the size of the mechanism. I have found that a clearance range of .006 to .025 inch is satisfactory for most purposes. It will be apparent that the mounting ribs 21 may be cast directly in the T-shaped, aligned openings in the magnet laminae. Alternatively, such ribs may comprise precision castings, of a suitable material such as bronze, beryllium-copper, etc., that are soldered or cemented to the magnet laminae. As shown in Figures 6 and 7, the two end laminae of the magnet may include beveled sections and the material of the mounting ribs is flared over such beveled sections. Such overlapping of the rib material will, of course, occur automatically if the ribs are cast or molded into the openings of the magnet laminae. When the mounting ribs are made as separate units and inserted into such openings, the rib material may be displaced by applying a sharp blow (or suitable pressure) to a sharp-pointed tool to form the channels 25 in the rib material. In any case such arrangement serves to prevent axial movement of the mounting ribs relative to the magnet core. This method of bonding the mounting ribs to the magnet core may be employed with the Figure 1 embodiment of the invention to increase the mechanical strength of the core assembly.

In addition to the openings for the mounting ribs, each lamina includes two diametrically-opposed holes 26. The effect of these holes is to increase the reluctance of the magnet along the magnetic axis, thereby reducing the magnetic flux at this point. By making the holes 26 of proper size, with respect to the magnet material and the air gap length, a more uniform distribution of the magnetic flux along the arcuate air gaps is obtained. In fact, non-magnetic rivets 26' may be inserted in such holes to secure the laminae. Also, the mounting ribs are provided with threaded bores 27 for receiving the studs to support the instrument bridges, as has been explained with reference to Figures 2 and 4.

Inasmuch as the mounting ribs of the Figures 6-7 construction do not contact the inner wall of the surrounding, soft-iron yoke, a proper centering of the magnet core is facilitated by the use of a fixture such as that shown in Figures 8 and 9. The fixture, preferably made of brass or other non-magnetic material, comprises a base 30 having a central opening 31 therein and four posts 32 terminating in the rounded pins 33. The diameter of the pins 33 is slightly less than the spacing to be established between the core system and the yoke. In the assembly operation, as shown in Figure 10, the pins are inserted into the bore of the yoke 24 whereby the yoke will rest on the shoulders provided by the posts 32. The core system is then inserted into the yoke so that it likewise rests upon such shoulders. It will be apparent that with the four pins disposed in different quadrants the spacing between the core system and the yoke, as established by the four pins, will be established readily and precisely. The four screws 23 are then threaded inwardly until the inner ends seat firmly within the correspondingly-aligned, transverse, holes in the mounting ribs as already explained.

It is to be understood that the invention is not limited to the constructions herein specifically described and shown since various modifications which may occur to those familiar with the design and construction of electrical measuring instruments and instrument type relays fall within the spirit and scope of the invention as set forth in the following claims.

I claim:

1. An electrical instrument comprising a generally cylindrical unitary core of permanent magnet material transversely magnetized to have a pair of cylindrical polar surfaces, said core having diametrically opposed recesses of T-form in transverse section extending longitudinally of the core between the polar surfaces thereof, the width of the permanent magnet material between said recesses, as measured in a plane transverse to the axis of the core, being from about ½ to ⅔ of the maximum diameter of the permanent magnet material to cause the magnetic flux paths through said core to be of approximately uniform length, T-shaped mounting ribs of non-magnetic material completely filling the recesses and extending radially therefrom, a movable coil and means supporting the same for angular displacement about substantially the axis of said core, a ring-shaped yoke of soft iron coaxially surrounding said core and coil, the opposed surfaces of said yoke and the permanent magnet material of said core being portions of the cylindrical surfaces of right circular cylinders having axes displaced from each other in the plane extending through the magnetic axis of the core to cause the air gaps between said yoke and said magnet surfaces to decrease in radial length from a maximum value at the magnetic axis of the core and in proportion to the lengths of the flux paths through the core, and means adjustably mounted in said yoke and engaging said mounting ribs for securing said core within and spaced from said yoke.

2. An electrical measuring instrument as recited in claim 1, wherein the inner surface of the yoke is the cylindrical surface of a right circular cylinder.

3. An electrical instrument as defined in claim 1 wherein the longitudinal edges of said mounting ribs adjacent said yoke are provided with slots, and further including mounting screws threaded through opposite walls of said yoke in a plane through the axis of the bore thereof, said mounting screws having tips seated in the slots of the ribs at opposite sides of said core assembly to secure the core assembly to the yoke.

4. An electrical instrument as recited in claim 3, wherein the overall width of the core assembly at the mounting ribs is less than the internal diameter of the bore of said yoke, whereby the core assembly may be displaced parallel to a plane through said mounting screws by complementary adjustments of the sets of screws which are seated against the respective mounting ribs.

5. An electrical instrument as recited in claim 4, wherein said slots are V-shape, and the screws are sharply pointed to seat in the vertices of said slots.

6. An electrical instrument as recited in claim 4, wherein said means supporting said coil for angular movement includes bridges and means mounting said bridges on the ribs of said core assembly.

References Cited in the file of this patent

UNITED STATES PATENTS

| | | |
|---|---|---|
| 1,000,942 | Pratt | Aug. 15, 1911 |
| 1,927,346 | Lawrence | Sept. 19, 1933 |
| 2,066,942 | Massa | Jan. 5, 1937 |
| 2,408,060 | Grace | Sept. 24, 1946 |
| 2,719,267 | Kunz | Sept. 27, 1955 |

FOREIGN PATENTS

| | | |
|---|---|---|
| 2,125 of 1902 | Great Britain | Jan. 1, 1903 |
| 422,878 | Great Britain | Apr. 23, 1934 |
| 962,769 | France | June 20, 1950 |